Dec. 4, 1928.

N. I. CLARK 1,693,888

CHECK VALVE FOR WATER CIRCULATING SYSTEMS

Filed Dec. 15, 1924

N. I. Clark,
Inventor

By Clarence A. O'Brien
Attorney

Patented Dec. 4, 1928.

1,693,888

UNITED STATES PATENT OFFICE.

NOLAN I. CLARK, OF BEGGS, OKLAHOMA.

CHECK VALVE FOR WATER-CIRCULATING SYSTEMS.

Application filed December 15, 1924. Serial No. 756,069.

This invention relates to improvements in water circulating systems for internal combustion engines, and has for its principal object to provide a check valve in connection therewith for preventing the back flow of the water from the water conduit to the usual cylinder water inlet connection.

One of the important objects of the invention is to provide a fitting which is adapted to be disposed within the water jacket of an internal combustion engine, preferably of the Ford type, and having communication with the usual cylinder water inlet connection so that the water circulating through the internal combustion engine will enter the water jacket through the fitting, means being associated with the fitting for preventing the back flow of the water therethrough.

A still further object of the invention is to provide a device of the above mentioned character, which is simple in construction, inexpensive, strong and durable, and further well adapted for the purpose for which it is designated.

Other objects and advantages of this invention will become apparent during the course of the following description.

Figure 1:
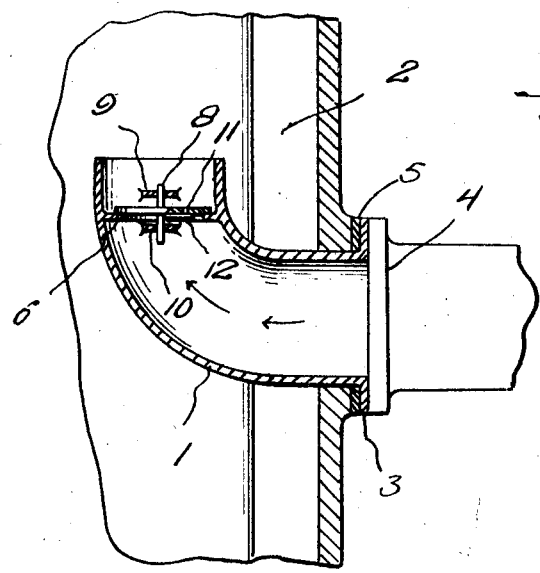
Figure 2:
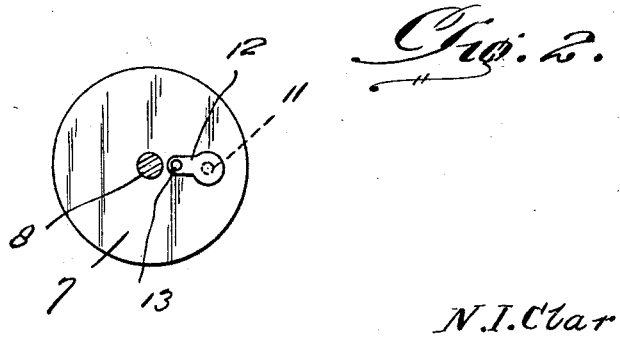

In the accompanying drawing, forming a part of this specification, and in which like numerals designate like parts throughout the same:

Figure 1 is a sectional view of the fitting, embodying my invention, showing the same attached, and Figure 2 is a bottom plan view of the flat valve.

In the drawing, wherein for the purpose of illustration is shown the preferred embodiment of my invention, the numeral 1 designates an elbow fitting which is adapted to be disposed within the water jacket of an internal combustion engine, the outer end thereof being provided with a suitable flange 3, which is interposed between the cylinder water inlet connection 4 and the water jacket 2, whereby the fitting is supported in proper position within a water jacket. A gasket or washer 5 is associated with the flange 3, in the manner as clearly illustrated in Figure 1. The fitting is supported within the water jacket so that the water entering the water jacket from the cylinder inlet projection 4 will be caused to pass therethrough.

An annular flange 6 is formed in the upper portion of the elbow fitting 1, and provides a valve seat for supporting the flat valve 7. A vertical stem 8 extends centrally through the flat valve and the ends thereof are adapted for slidable movement through the upper and lower guides 9 and 10 respectively. The guides comprise transversely extending strips or bars, which are disposed within the upper portion of the elbow fitting on opposite sides of the flanges 6. When the water circulating system of the internal combustion engine is functioning, the flow of the water through the fitting into the water jacket of the cylinder will unseat the valve 7, and permit the water to flow into the water jacket. When the circulation of the water ceases, the flat valve will be seated on the annular flange 6 and thus prevent the backflow of the water from the water jacket into the elbow fitting and the inlet water connection 4.

For the purposes of draining the water, which may collect in the top of the elbow fitting, the flat valve 7 is provided with an opening 11, the same being normally closed, by the pivoted closure plate 12, which is pivoted as at 13, on the bottom of the flat valve.

It is only necessary for the valve 12 to be actuated manually two times in a year, once in the fall of the year at a time before freezing weather sets in and the other time in the spring. Access to the valve 12 is had by disconnecting the connection 4, and then bodily removing the fitting 1 outwardly of the water jacket 2 so that a mechanic may reach the valve 12 for moving the same to an open position in the fall. The valve 12 is thus open during freezing weather so that the water jacket of the engine will be drained at will by simply operating the usual drain cock located at the bottom of the radiator. The valve 7 will operate with the valve 12 open and as the opening 11 is relatively small, the efficiency of the operation of the valve 7 will not be materially affected when the valve 12 is opened. The valve 12 is only left open during the cold months of the year, at which time the low atmospheric temperature helps keep the engine cool.

During the warm weather, when the atmospheric temperature is high, the valve 12 is closed, thus giving the circulating check valve full efficiency in its operation.

The provision of a device of the above mentioned character, permits the same to be easily and readily inserted in position, and is more particularly adapted to be used in conjunction with internal combustion engines of the Ford type. Furthermore, the fitting is of such construction as to render the operation of the check valve positive and efficient.

While I have shown the preferred embodiment of my invention, it is to be understood that various changes in the size, shape, and arrangement of parts may be resorted to, without departing from the spirit of the invention and the scope of the appended claim.

Having described my invention, what is claimed is:

In a water circulation device for internal combustion engines a curved elbow fitting adapted to be removably disposed within the water jacket of the engine so as to communicate at its lower end with the usual cylinder water inlet connection of the engine, an annular flange formed in the inner upper portion of the elbow fitting and providing a valve seat, a pair of transverse bars mounted in the upper end of the elbow fitting, one above and one below the flange, said bars being provided with registering openings in the central portion thereof, a flat valve seatable on the flange, a vertical stem extending through the flat valve, the ends of the stem being slidable through the openings in the guide bars, said flat valve being provided with a drain opening, and a pivoted closure for the drain opening.

In testimony whereof I affix my signature.

NOLAN I. CLARK.